Nov. 10, 1959  F. SCHAUB ET AL  2,911,730
DRYING OF DIVIDED SOLID MATERIALS
Filed March 19, 1956  4 Sheets-Sheet 1

INVENTORS
FRANZ SCHAUB, WILFRIED von HOFFMANN, OTTO ROELEN, WINFRIED DROPE

By *Burgess, Dinklage + Sprung*

ATTORNEYS

Nov. 10, 1959   F. SCHAUB ET AL   2,911,730
DRYING OF DIVIDED SOLID MATERIALS
Filed March 19, 1956   4 Sheets-Sheet 4

INVENTOR
FRANZ SCHAUB, WILFRIED von HOFFMANN, OTTO ROELEN, WINFRIED DROPE
By Burgess, Dinklage + Sprung
ATTORNEYS

United States Patent Office 2,911,730
Patented Nov. 10, 1959

2,911,730

DRYING OF DIVIDED SOLID MATERIALS

Franz Schaub, Oberhausen-Holten, Wilfried von Hoffman, Oberhausen-Sterkrade, and Otto Roelen and Winfried Drope, Oberhausen-Holten, Germany, assignors to Ruhrchemie Aktiengesellschaft, Oberhausen-Holten, Germany, a corporation of Germany Application March 19, 1956, Serial No. 572,559

Claims priority, application Germany March 19, 1955

10 Claims. (Cl. 34—57)

This invention relates to new and useful improvements in the drying of divided solid materials.

The drying of relatively small particle size divided materials or pulverulent materials by passing the same through an elongated drying zone as, for example, in the form of a tube or shaft entrained in a heated gas, is known. This drying process is often referred to as "stream drying" and the heated gas causes evaporation of liquid adhering to the solid particles being dried. In this process which has proven particularly favorable as compared with other drying processes, the moist material is admixed with a stream of previously heated gas or superheated steam and passed with the same through a long tube in an upward direction. The heat required for the drying, i.e. for the evaporation of the liquid and warming up of the solids, is generally supplied by the sensible heat of the pre-heated gases.

This process, however, has certain disadvantages. A relatively high gas flow rate must be used in order to insure the pneumatic conveyance of the divided solid material being dried and particularly in the case of coarser particles. This high gas flow rate is also required in order to prevent incrustations of the material being dried from forming on the tube walls. Such incrustations would generally form when the divided material in moist form contacts the wall at a low flow rate. With the use of such high gas flow rates, however, correspondingly long tubes are required in order to insure the necessary residence time for the drying operation.

Furthermore, in the above described drying process, it is often desirable to supply the necessary heat for the drying operation through the tube walls. With a substantially straight-line pneumatic conveyance of the solids through the tubes, however, the heat transfer value from the tube walls to the solids is relatively low and is not uniform. The drying velocity of the individual particles therefore varies considerably depending upon the distance thereof from the heated wall with, for example, the particles in the peripheral portion of the tube receiving more heat and drying faster than those in the central portions of the tube.

The above-mentioned disadvantages are particularly undesirable and detrimental when drying heat sensitive materials since in such cases the drying temperatures and consequently, the drying efficiency per unit gas quantity have to be controlled in order to avoid deterioration of the material.

A further disadvantage of the above-mentioned process resides in the fact that in the case of a more or less straight-line pneumatic conveyance, the solids flow in a pronounced and often intensely conglomerated string-like form within the carrier gas. This hinders the uniform progress of the drying process and entails both an extension of the drying time and the danger of super-heating of a certain portion of the particles.

One object of this invention is to overcome the above-mentioned disadvantages. This, and still further objects will become apparent from the following description read in conjunction with the drawings, in which.

In accordance with the invention, the disadvantages of the above-described stream drying are avoided by conducting the stream of gas containing the divided solid material of a relatively small particle size (especially for particles with a diameter up to 1 mm.) through the drying chamber with a helical flow path. With the use of this helical flow path in accordance with the invention, it is possible to use a relatively short chamber as, for example, a tubular chamber, while at the same time, using a sufficiently high gas velocity to insure a safe advance of even the larger particles and to avoid incrustations forming on the chamber wall. With the use of the helical flow path, in accordance with the invention a centrifugal force is exerted on the solid particles being dried so that the same are forced toward the chamber wall and move along the chamber in the form of a curtain. In this form, an excellent transfer from the chamber wall to the particles may be effected so that it is possible to heat the chamber walls and continuously supply heat during the drying process. Due to the fact that the materials pass along the walls at a relatively high velocity in spite of a small total amount of the conveying gas and a low linear velocity in an axial direction, the results are extremely favorable to heat transfer conditions as compared with the conventional process. These conditions are still further improved by the fact that in contrast to the conventional stream drying process, high relative velocities between the drying gas and the solid material result due to the friction between the solid material and the chamber wall. It is also possible, in accordance with the invention, to sub-divide the heating of the chamber over the length thereof using different temperatures in order to obtain the highest drying capacities possible with a careful treatment of the material.

A further advantage of the invention results from the fact that in spite of the small quantities of drying gas required, the sliding velocity of the material along the chamber wall can be suitably chosen by correspondingly selecting the spiral pitch of the helical path in order to minimize the tendency of the material to cake on the walls, which tendency is dependent upon the flow velocity.

The invention will be described in further detail with reference to the embodiments shown in the accompanying drawings.

Figure 1:
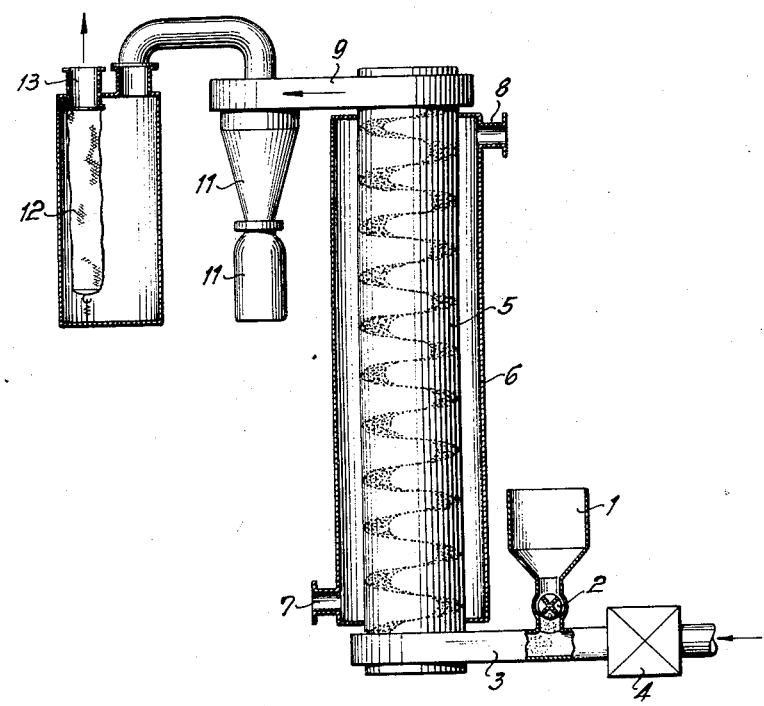
Fig. 1 is a diagrammatic side elevation partially in section showing an embodiment of an apparatus effecting the drying process in accordance with the invention.
Figure 2:
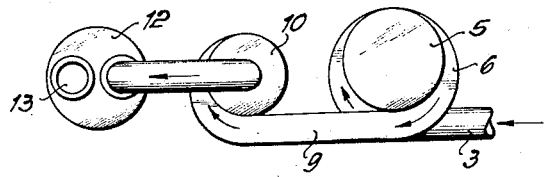
Fig. 2 is a diagrammatic plan view of the portion of the apparatus shown in Fig. 1.

Referring to the embodiments shown in Figs. 1 and 2, 1 designates a funnel-type supply hopper for the divided material to be dried. This hopper 1 feeds into the gas supply pipe 3 by means of the bucket wheel arrangement 2. The gas supply pipe 3 is provided with a heater 4 for heating gas being passed therethrough and feeds tangentially into the chamber 5 which is in the form of a vertical shaft or tube. The walls of the shaft 5 are surrounded by the heating jacket 6 having the inlet and outlet pipe connections 7 and 8 through which a suitable fluid heating medium may be passed.

At the upper end, the shaft 5 is provided with the tangential outlet pipe 9 which leads into the cyclone separator 10 provided with the collecting vessel 11 for the solid components. The gas outlet from the cyclone 10 leads into a chamber provided with a filter cloth 12 and an outlet 13.

In operation, a drying gas such as air is heated in the heater 4 and passed through the pipe 3 at a suitable velocity. The divided material to be dried is fed into the pipe 3 at a suitable rate by means of the bucket wheel feeder 2 and becomes entrained in the moving gas stream. Due to the tangential inlet from the pipe 3 into the shaft 5, the gas with the entrained solids as it enters the shaft 5, is imparted a rotary motion and flows upward through the shaft 5 following a helical flow path. Due to the helical flow path, the divided material has a flow length through the shaft 5 which is actually many times the length of this shaft and is maintained in contact with the walls of the shaft 5. A heating media may be passed through the heating jacket 6 by means of a connection 7 and 8 and the sensible heat thereof will be transferred very efficiently through the shaft wall to the solid material being conveyed in the gas stream in a very efficient manner. The temperature imparted to the gas stream by the heater 4 and the heat transferred from the heating media and the heating jacket 6 through the walls of the shaft to the material should be sufficient to effect the desired drying of the solid material when the same reaches the upper end of the shaft. At the upper end of the shaft the solid material entrained in the gas stream, passes through the pipe 9 into the centrifugal separator 10 of the cyclone. The feed into the separator 10 is also tangential so that the rotation of the gas causes a centrifugal separation of the dried solid material which falls and is collected in a collecting vessel 11. The gas removed from the solid material flows out through the central outlet pipe into the connected chamber through the cloth filter 12 and out through the pipe 13. This gas contains in the form of vapor the moisture absorbed from the solid particles which may easily be separated, if desired, by cooling.

The cloth filter 12 retains the last residue of any entrained finely divided solid material.

The drying process is generally effected without completely saturating the stream of gas with the vapor. During the passage to the shaft 5, the gas is also heated up with a resulting substantial increase in its saturation point. For this reason, the bulk of the gas flowing off 10 may be recycled to the process after the absorbed moisture has been withdrawn by cooling. The gas leaving this closed system among the solid material has to be re-filled by a controlled valve.

The tangential inlet of the gas stream from the pipe 3 to the shaft 5 constitutes the simplest manner in which the rotary motion of the gas stream and the entrained solids for the helical path may be effected. This rotary motion can, of course, be brought about in any other known or desired manner. With the tangential feed, the tangential component of motion of the material thereby produced although gradually diminishing during the flow through the shaft, maintains itself over a considerable length of the shaft. The use of a guide system over the entire shaft length or over a portion thereof has proven particularly effective for maintaining the helical flow path through the shaft. Such a guide system may be used alone or in connection with a tangential feed of the gas into the shaft. Such a guide system may be, for example, in the form of guide vanes arranged on a centrally installed tube or rod or at the wall of the shaft itself. With the use of such a guide system the desired flow conditions are insured over the entire length of the tube with a relatively low loss of pressure.

It is also possible, in accordance with the invention, to supply additional heat by providing a tube for a heating media extending axially through the central portion of the drying chamber. The above-referred to guide vanes may be arranged on this heatable central tube. The guide members may, for example, be constructed as blades or vanes spaced at intervals and having the form of sections of helical vanes or guide plates. With the use of such guide members arranged at intervals, the stream of gas and material is repeatedly sub-divided and the existent tendency to form string-like conglomerates is avoided with the solid material forming a uniform curtain thus utilizing the total heating surface.

In the case of drying materials which have a high tendency to deposit on the walls of the chamber, the building up of such deposits and the interference of the operation, can be avoided by providing rotary guide vanes positioned in contact or closely adjacent the inner surface of the chamber and rotating these vanes so that the same will continuously remove any deposits which may form. The blades of the guide vanes may for this purpose be formed with a yielding spring-like construction and be positioned in such a manner as to sweep over the entire inner wall surface while moving. Additionally the number of revolutions of the guide and the sweeping member may be maintained very low. It is also possible, of course, to use stationary guide vanes and to rotate the chamber wall. The cleaning action of the rotary guide members may also be effected without actual contact of the blades with the chamber wall and by merely having the blades move along the wall tube at a slight distance therefrom. With this arrangement, air will flow through the space between the blades and the wall at a relatively high velocity effecting a cleaning action.

By increasing the number of revolutions of the rotating guide member and appropriately positioning the vanes at least on a part of the tube length, it is not only possible to effect the movement of the drying gas and the material along the desired helical path through this tube, but also to accelerate the flow so that the guide members act at the same time as conveying members in place of special blowers or the like which might otherwise be required. In the case of a sufficiently high number of revolutions, the blades may also consist of flat vanes arranged in an axial direction. Vanes of this type may, of course, be manufactured very simply and economically.

Figure 3:
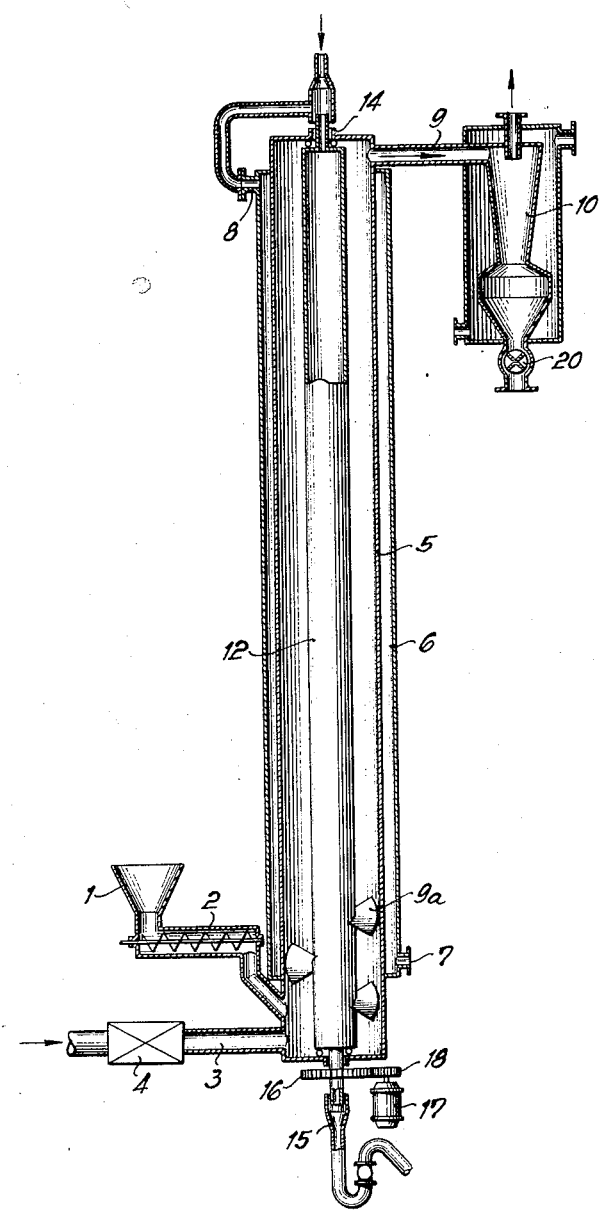
Figs. 3, 4 and 5 are diagrammatic vertical sections of still further embodiments of apparatuses for effecting the process in accordance with the invention.

An embodiment of a device of the above-mentioned type having a central heating tube and rotatable guide vanes is shown in Fig. 3. In this embodiment the material to be treated is charged from the container or hopper 1 through the feed worm 2 directly into the drying shaft 5. The drying shaft 5 is heated by passing a heating medium such as a liquid or a gas through the heating jacket 6 by means of connections 7 and 8. Axially positioned through the central portion of the shaft 5 is a hollow rotatable central tube 12. This tube may also be heated by passing heating medium through the interior of the same. As shown, a common heating media inlet is provided for this central tube 12 and for the heating jacket 6 leading into the latter through the connection 8. An outlet 15 is provided from the central tube for the heating media. When, for example, steam is used as the heating media, condensed steam may be removed through this outlet. Guide vanes 9a are connected to the central tube 12 and are positioned in contact with or closely adjacent the inner wall of the shaft 5. These vanes may extend over the entire length of the tube and are inclined in accordance with the helical flow path desired. The same may have a yielding construction so that their outer edges sweep over the inner wall of the pipe 5 in a resilient manner. The tube 12 with the guide vanes 9a connected thereto is rotatably driven by means of the electric motor 17 and the transmission gear arrangement 16 and 18. A gas inlet pipe 3 provided with a heating device 4 leads into the bottom of the shaft 5 and an outlet pipe 9 leading into the cyclone separator 10 having bucket wheel discharge 20 is connected to the upper portion of the shaft 5. In operation, the divided material to be dried or otherwise heated and cooled is fed from the hopper 1 by means of the feed worm 2 into the lower portion of the shaft 5. At the same time, a gas such as air is passed in through the pipe 3 and prior to passage may be heated by the heater 4 of conventional construction. As the gas enters the lower end of the shaft 5 the same flows upward entraining the divided particles to be dried or otherwise treated and is imparted a helical flow motion by means of the vanes 9a. Due to this helical motion, the gas stream with the entrained solids, follows a helical path upwards through the shaft. With this helical flow motion, the solids spread in the form of a uniform curtain of the inner surface of the shaft 5 and heat from the heating jacket 6 is uniformly transferred thereto for the drying process. Additional heat is transferred from the heating media in the central tube 12. Any deposits of the solid material formed on the wall are quickly removed by the rotating vanes 9a. At the upper end of the shaft 5 the gas with the entrained solids which are now dried or otherwise heated is passed into the cyclone separator 10 where the solids are separated therefrom and removed through the bucket wheel discharge 20 while the gas containing the removed moisture flows out of the central discharge pipe from the cyclone. The cyclone separator 10 may be insulated or may be provided as shown with a heating jacket in order to prevent condensation of the moisture from the drying gases and thus re-wetting the dried particles. The gas discharged from the cyclone 10 may be re-cycled to the conduit 3 after removal of a portion of the entrained moisture as, for example, by condensation. The heating of the cyclone separator 10 may also serve to cause an additional drying effect. Besides recycling of the effluent gas stream, the solid material recovered from the bucket wheel discharge 20 may be re-cycled if the same is not completely dried.

While the drying apparatus in accordance with the invention is preferably operated with a vertical positioned elongated drying chamber as the shafts shown in the embodiments previously described and with the gas stream and the divided solid material to be dried introduced in the lower portion of the chamber and conveyed in an upward direction, it is also possible to arrange the chamber in any desired position as, for example, a horizontal or inclined position and/or to pass the gas stream with the entrained divided particles in the reverse direction. The gas stream with the entrained material may also be passed through several tubes in succession as, for example, alternately in upward and downward direction or through several tubes connected in parallel. It is furthermore possible to place several drying chambers concentrically one within the other in order to obtain the most economical utilization of space.

Figure 4:
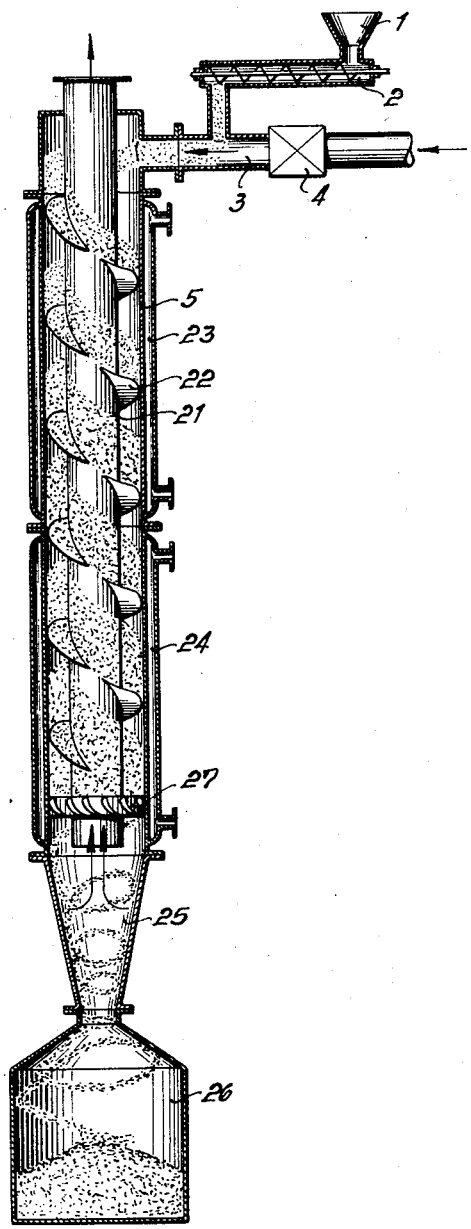

In the embodiment as shown in Fig. 4, the drying gas with the entrained solid material being dried, flows in a substantially downward direction into the lower end of the drying chamber which is constructed in the form of a cyclone separator. The gas after being pre-heated by the heater 4 enters the pipe 3 and entrains divided solid material to be dried which is passed into this pipe from the feed hopper 1 by means of the worm conveyor 2. The mixture of the drying gas and the divided material to be dried then flows into the upper end of the drying chamber which is in the form of a vertical shaft 5 having a circular cross-section. A hollow pipe 21 extends axially through the center portion of the shaft 5 to form an annular drying space therebetween through which the gas and divided material flow in a downward direction. Connected to the central pipe 21 are the spiral guide vanes 22 in the form of interrupted segments of a helical worm. These guide vanes cause the mixture of the gas and divided material to follow a helical flow path in the annular space between the inner wall of the shaft 5 and the outer wall of the central pipe 21. Due to this spiral motion, the solids to be dried, glide along the inner wall of the shaft 5 in the form of a finely distributed curtain rather than in a conglomerated string-like form. The upper portion of the shaft 5 is heated by heating media flowing through a heating jacket 23 and the lower portion is heated by heating media flowing through a separate heating jacket 24. The heat from these heating jackets is efficiently transferred to the finely divided material due to the form of its downward travel.

The bottom portion of the shaft 5 conically narrows in the form of a cyclone separator and leads into a collecting chamber 26. A guide vane ring 27 is positioned in the annular passage between the shaft 5 and central pipe 21 just prior to the conically narrowing portion 25. As the spirally moving drying gas and entrained solids passed through this guide vane ring 27 the same are imparted a faster rotational movement causing a centrifugal separation in the conically shaped narrowing section 25 in the identical manner to a cyclone separator. The gas from which the solid material has been centrifugally separated flows upwardly through the central pipe 21 and escapes or is re-cycled to the process while the separated solid material falls downwardly and is collected in the collector 26.

In applications of the process where divided materials are used which have different size or specific gravity which undergo a change of size or specific gravity, the centrifugal force imparted to the solid material by the helical flow path can be utilized to effect a separation according to this size and/or weight difference of the particles. Thus, when drying in a drying chamber in the form of a conical or cylindrical tube, the rotary motion of the helical path of flow therethrough may be adjusted by a corresponding slope of the guide members in such a manner that the still moist and heavy particles due to the centrifugal force remain at the wall of the drying chamber while the lighter particles which are already dried, due to the reduction in the centrifugal force caused by their decrease in weight move centrally into the gas stream and are discharged with the same to be separated from the latter in a cyclone or other conventional separator. Conversely, when effecting a synthetic process in which solid particles are formed from gases, as for example, a polymerization process such as the polymerization of ethylene and in which a cyclone type apparatus is used, the latter may be constructed in such a manner that the heavy particles which are no longer able to react are separated and the lighter particles continue to be subjected to the treatment as, for example, the polymerization. It is also possible to provide several treating stages in succession with the particles in each treating stage being separated in the manner described above after completion of their treatment in that stage and passed to the next subsequent stage for further treatment.

Figure 5:
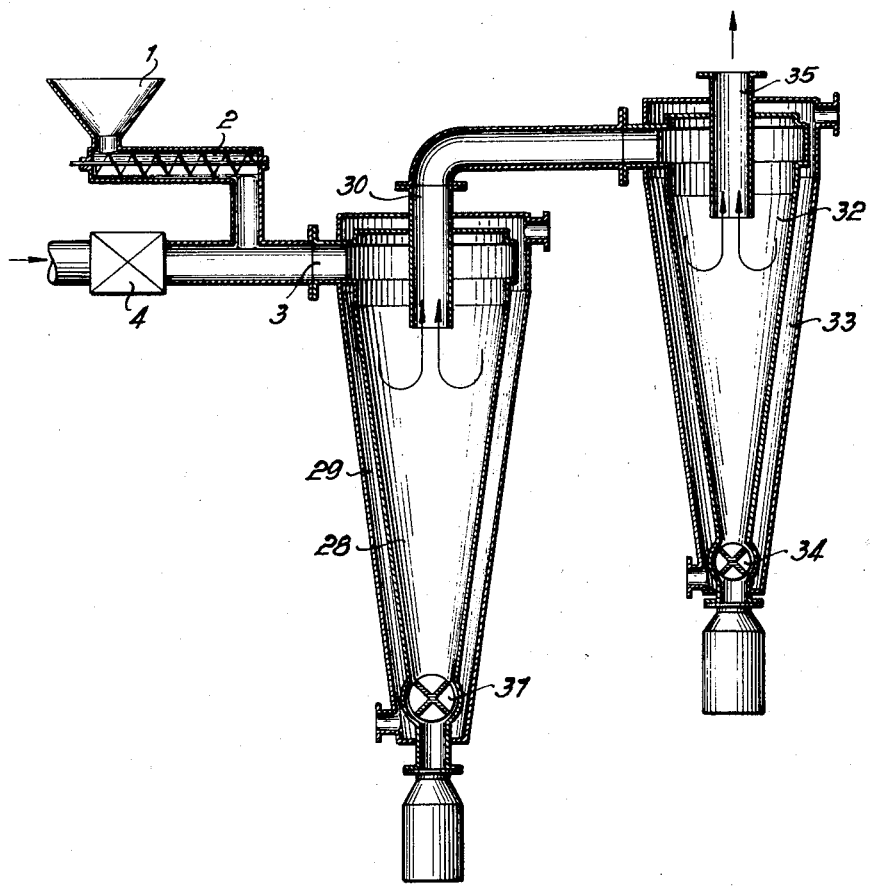

In the embodiment as shown in Fig. 5, several series connected heating chambers are provided which are constructed in the form of cyclones. The divided solid material to be dried or otherwise treated is passed from the hopper 1 into the gas feed pipe 3 by means of the worm type feed device 2. Gas, after pre-heating in the heating device 4 is passed through the gas inlet pipe 3 where the same picks up and entrains the divided solid material fed into this pipe. The gas enters tangentially into the first treating chamber 28 which has a frustro conical shape narrowing in a downward direction. The gas with the entrained solid follows a helical spiral flow path in the chamber 28 and the solids are dried by the heat from the carrier gas and by the heat absorbed from the inner wall of the chamber which is heated by the heating jacket 29. The dried material is discharged from the chamber 28 through the bucket or cellular wheel 31 while the gas stream discharges through the centrally positioned outlet pipe 30 from which it flows tangentially into the subsequent series connected cyclone separator 32 which is heated by the heating jacket 33. Entrained divided solid material carried off from the chamber 28 is separated in the cyclone 32 and discharged therefrom through the cellular wheel 34. The gas with the solid material completely removed therefrom escapes through the central pipe 35 of the cyclone 32. The operation is preferably effected by a corresponding construction in the first cyclone so that in the first cyclone 28, heavier particles which are not yet sufficiently dried separate out and are re-cycled to the hopper 1 for re-drying whereas the lighter particles which are almost completely dried escape into the second cyclone 32 from which the same are recovered in dry form.

The embodiment as shown in Fig. 5 is particularly well suited for the treatment of gaseous materials from which solid particles are formed since sufficiently large particles are separated in the first cyclone 28 while those particles which are still too fine remain in the carrier gas until they are separated in the next or a still subsequent cyclone.

While the invention has been described in detail with reference to the specific embodiments shown, various changes and modifications will become apparent to the skilled artisan which fall within the spirit of the invention and scope of the appended claims.

To show some results of the application of the invention there will be given 4 working examples concerning the drying of powdered plastics, heating of lime-stone-powder and the polymerization of ethylene.

Example No. 1 and 2 show the application of this process for drying of polyethylene-powder. The powder contains 40% $H_2O$ (relative to the dry material) and the mean particle size will be 0.01 mm. $\phi$. The diameter of the drying tube is 150 mm. and the length heated by steam of 1.8 kg./cm.$^2$ is 3.2 m. Therefore the heat-transferring area will be 3.5 m.$^2$. The transporting and drying gas is air, which is preheated to 120° C. before entering the drying tube. The volume-rate of the drying gas is 200 Nm.$^3$/h. and the gas velocity upwards in the direction of the drying tube 4.2 m./sec.

| Results obtained | Example 1 | Example 2 |
| --- | --- | --- |
| Material flow rate_____kg./h__ | 75 | 100 |
| Material loading rate of the air_____g./cm.$^3$__ | 275 | 370 |
| Temperature of the entering material_____° C__ | 20 | 20 |
| Temperature of the leaving material_____° C__ | 70 | 60 |
| Temperature of the leaving air_____° C__ | 80 | 70 |
| Moisture of the leaving air_____percent__ | 20 | 53 |
| Evaporated water_____kg./h__ | 30 | 40 |
| Moisture of the dried material_____percent__ | 0.1 | 0.2 |
| Heat transferred_____kcal./h__ | 20,000 | 26,000 |
| Pressure drop in the drying tube_____mm. WS__ | 90 | 100 |

Example No. 3 describes the application of the invention for heating of dry lime-stone-powder with a specific surface of 5000 cm.$^2$/g. The drying tube, which is a part of a pneumatic lime-stone-powder transportation system has a diameter of 80 mm. and a heated length of 3.5 m. Therefore the heating area will be 0.867 cm.$^2$. For the pneumatic transport will be used 145 Nm.$^3$/h. of cold air. The heating jacket will be heated by steam of 16.4 kg./cm.$^2$ corresponding to a saturation temperature of 204° C.

The results:

| | |
| --- | --- |
| Heated lime-stone-powder _____t/h__ | 3,3 |
| Temperature of the entering lime-stone-powder _____°C__ | 18 |
| Temperature of the leaving lime-stone-powder _____°C__ | 132 |
| Temperature of the entering air _____°C__ | 19 |
| Temperature of the leaving air _____°C__ | 145 |
| Material loading rate of the air _____kg./m.$^3$__ | 20 |
| Heat transferred _____kcal./h__ | 76,000 |
| Heat transfer value (for the solid material only) _____kcal./m.$^2$/h. °C__ | 740 |
| Pressure drop in the drying tube ____mm. Hg__ | 90 |

Example No. 4 describes the application of the invention for the catalytic polymerization of ethylene. Therefore a system of 2 parallel jacket-cooled tubes connected on the top by an arrow tube and by a ventilator in the bottom will be used. Guide systems in the described form of guide vanes are installed in both tubes. In this closed system flows driven by the ventilator a current of ethylene transporting pneumatically polyethylene and the catalyst.

Fresh ethylene with a concentration of 98% enters continuously this system to fill up the polymerized rate and a part of low concentrated ethylene (90%) leaving the system by a cyclone transports out the output into a container. In the bottom of the container the output leaves by a bucket wheel arrangement. A small amount of the output will be given back out of the container to the process in the described closed system by a worm. Passing the worm fresh catalyst will be spread on this material. Within the closed cooling system which is cooled by an open water cooling system an electric start heater which may heat up the whole process to reaction temperature is installed. The process will be controlled especially by a pressure gage (showing indirectly the consumption of ethylene) and a thermometer.

Working conditions and result:

| | |
| --- | --- |
| Gas-Current speed within the closed system _____m./sec__ | 10 |
| Polyethylene loading rate within the closed system _____g./cm.$^3$__ | 1500 |
| Catalyst spread on the retransportated part of the output in the worm _____kg./h__ | 0.022 |
| Catalyst consisting of: | |
| Diäthylaluminiummonochloride ____kg./h__ | 0.0166 |
| Titantetrachloride _____kg./h__ | 0.0054 |
| Output of polyethylene _____kg./h__ | 11 |
| Reaction temperature within the closed system _____°C__ | 80 |
| Pressure within the closed system __kg./cm.$^2$__ | 1 |
| Heat transferred to the cooling system kcal./h__ | 7750 |

We claim:

1. Apparatus for drying finely divided solid material, comprising a vertical, substantially cylindrical shaft, a heating jacket surrounding said shaft, a hollow pipe rotatably mounted and extending axially through the central portion of said shaft, means for passing a heating medium to said heating jacket and said pipe, means for passing a gas stream to the lower portion of said shaft, and means for passing divided material into the lower portion of said shaft for entrainment by said gas stream, guide vanes connected to said central pipe and defining a helical flow path in the annular space between said pipe and the inner wall of said shaft, means for rotating said central pipe, an outlet at the upper portion of said shaft for gas and entrained solid material, and separating means connected to said outlet for separating entrained solid from gas.

2. Apparatus for drying finely divided solid material comprising means defining an elongated drying chamber having a substantially circular cross-sectional shape including a central support member axially extending through said chamber having guide vanes extending therefrom defining a helical path of travel for the gas stream passed therethrough, means for entraining divided solid material in a gas stream and passing the gas stream and entrained solids through said chamber along said helical path of travel, means for heating at least a portion of the inner chamber wall whereby material is centrifugally passed in contact with said inner wall to effect the drying of the solid material and means for separating the divided solid material and gas after passage through said chamber.

3. Apparatus according to claim 2 in which said central support is a hollow pipe and including means for passing a heating medium through said pipe.

4. Apparatus according to claim 3 in which said central pipe is mounted for rotation.

5. Apparatus according to claim 2 in which said central pipe is mounted for rotation.

6. Apparatus according to claims 2 in which said guide vanes are spaced apart having the form of sections of helical vanes.

7. Apparatus according to claim 2 in which said guide vanes are formed of a resilient material.

8. Apparatus according to claim 3, in which said guide vanes terminate adjacent the chamber wall and including means for rotating said shaft.

9. Apparatus according to claim 8, in which said guide vanes are positioned in resilient contact with the inner surface of the chamber wall.

10. Apparatus according to claim 2, in which said means for passing the gas stream and entrained solids through said chamber along a helical flow path include a tangential inlet pipe into said chamber.

References Cited in the file of this patent

UNITED STATES PATENTS

| | | |
|---|---|---|
| 748,893 | Trump | Jan. 5, 1904 |
| 2,364,274 | Crawford | Dec. 5, 1944 |
| 2,394,605 | Friedman | Feb. 12, 1946 |
| 2,435,927 | Manning et al. | Feb. 10, 1948 |
| 2,696,677 | Molenaar | Dec. 14, 1954 |